United States Patent Office 3,721,580
Patented Mar. 20, 1973

3,721,580
SURFACE TREATMENT POLYMER STRUCTURES
Gene F. Trott, Clarksville, Ind., and Joseph M. Starita, Louisville, Ky., assignors to General Electric Company, Louisville, Ky.
No Drawing. Filed Mar. 31, 1971, Ser. No. 129,951
Int. Cl. B32b 27/06, 27/16; B44d 5/12
U.S. Cl. 117—118   13 Claims

ABSTRACT OF THE DISCLOSURE

The surface characteristics of parts composed of or containing an aromatic carbocyclic polymer are improved by contacting the surface with an imido-alkylene compound and a Friedel-Crafts' alkylation catalyst in the presence of a selected mixture of solvents having a limited solubility for the polymer to effect a reaction of the imido-alkylene compound with the polymer surface.

---

The present invention relates to the surface treatment of shaped aromatic carbocyclic polymers to improve the surface characteristics thereof by an "imidization" process which is defined as a process whereby the aromatic carbocyclic organic polymer has undergone imido-alkylene substitution.

In the copending applications Ser. Nos. 838,322, now abandoned, and 846,623 filed July 1, 1969, in the names of Klebe and Windish, there are described and claimed methods of preparing imido-alkylene substituted organic polymers by reaction of any of a number of organic polymers having chemically combined aromatic carbocyclic radicals with an imido-methylene compound in the presence of a Friedel-Crafts' alkylation catalyst, such as boron trifluoride and products of such reactions. In general, the resultant imido-alkylene substituted or "imidized" products have improved solvent and abrasion resistance as compared with the unsubstituted polymers. However, they are also characterized by a softening temperature higher than the unsubstituted polymers, the softening temperature generally increasing with the degree of imido-substitution. As a result, the highly substituted polymers having the maximum solvent and abrasion resistance may be difficult or impossible to mold or shape by conventional means while those which can be more easily molded or shaped may not possess solvent and abrasion resistance significantly better than the unsubstituted polymers.

It is a primary object of the present invention to produce on the surfaces of a shaped structure composed of a readily moldable aromatic carbocyclic polymer, a reaction product of an imido-alkylene compound and the polymer which is characterized by improved solvent resistance, abrasion resistance or both.

The present invention is based on the discovery that the imido-alkylene substitution reaction of an aromatic carbocyclic polymer can be effected on the surface of a shaped product or structure composed of such polymer to provide a uniform surface coating having all of the desirable properties of the completely modified polymer.

Broadly, the method aspect of the present invention comprises effecting contact between the surface of a plastic part which contains an aromatic polymer and an imido-alkylene compound in the presence of an effective amount of a Friedel-Crafts' alkylation catalyst and a solvent component having a limited solubility for the aromatic polymer.

In the preferred practice of the method of the invention, contact is effected between the plastic part which is comprised of an aromatic organic polymer and the imido-alkylene compound in the presence of a Friedel-Crafts' catalyst and a solvent component which is a mixture of a good solvent for the polymer and a poor solvent for the polymer to introduce imido-alkylene substitution into the aromatic organic polymer at the surface of the plastic part.

The solvent mixtures can be composed of any organic solvent which is inert to the reactants and the organic polymer of the plastic part and any organic solvent which can solubilize the organic polymer on the surface of the plastic part.

Typical solvents are methyl chloride, methylene chloride, tetrachloroethane, chlorobenzene, carbon disulfide, nitromethane and nitrobenzene. Typical non-solvents are di-ethyl ether, saturated hydrocarbons such as hexane, heptane, methyl alcohol, ethyl alcohol, acetone, 1–3 butane-diol, ethylene glycol and other glycol ethers. These are employed in proportions for obtaining a limited softening or solution of the polymer surface.

The preferred alkylation catalyst is a boron trifluoride-etherate complex although other catalysts such as a boron trifluoride-methyl alcohol complex may be employed.

The imido-alkylene compounds employed in the practice of the invention prepared for example as described in the aforementioned applications, are of the formula

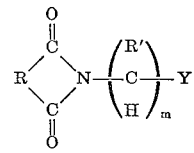

where R is a divalent organic radical selected from the class consisting of divalent hydrocarbon radicals and halogenated divalent hydrocarbon radicals, and R' is selected from hydrogen, monovalent hydrocarbon radicals, and halogenated monovalent hydrocarbon radicals, Y is a halogen or hydroxy radical, and $m$ is an integer having a value from 1 to 4 inclusive.

Radicals included by R, are, for example, arylene radicals, such as phenylene, biphenylene, naphthylene, anthrylene, etc., alkylene radicals, such as ethylene, trimethylene, tetramethylene, etc., halogenated arylene and alkylene radicals such as chlorophenylene, chloronaphthylene, chloroethylene, chlorotrimethylene, etc.; aliphatically unsaturated radicals such as,

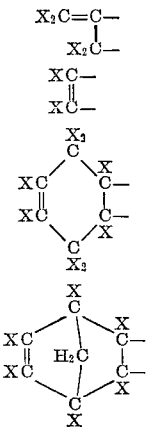

where X is a radical selected from hydrogen, lower alkyl, halogen, or mixtures thereof, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

The shaped aromatic carbocyclic structures, the surfaces of which are treated in accordance with the present invention may be in the form of sheets, rods, tubes, filaments or molded or otherwise self-supporting structures presenting a surface containing one or more aromatic carbocyclic polymers. Such polymers include any of the aromatic carbocyclic polymers described in the aforementioned Klebe and Windish applications. Examples of such polymers are polyethers, polyesters, polycarbonates, polyamides, polyamideimides, polysulfones, polyurethanes, polyimides, polybiurets, polyxylylene, polyarylacetylenes, polyphenylenes, polysulfides, polystyrene, poly(alpha-methylstyrene), poly(methyl - alpha - methylstyrene), poly(dimethylstyrene), poly(chlorostyrene), poly(dichlorostyrene), styrene copolymers and terpolymers with butadiene, acrylonitrile, methylmethacrylate, vinylidenechloride, maleic anhydride, vinylchloride, vinylacetate, alpha-methylstyrene, etc.

The shaped or molded structures may also include the usual molding compound additives such as plasticizers, pigments, curing catalysts, fillers and the like. Included among the fillers which can be employed are clay, talc, ground quartz, silica, sand, carbon black, glass fibers, asbestos, etc.

The invention is illustrated by the following examples.

EXAMPLE 1

Solutions were made up by dissolving 0.3 gram N-hydroxymethylmaleimide in each of three methylene chloride-boron trifluoride etherate solutions respectively containing 5, 15 and 20 percent methylene chloride. Samples of Lexan® polycarbonate sheet were placed in the solutions and left overnight.

The infrared spectra of the surfaces of these samples provided a comparison of the relative intensities of the absorptions at 1762 and 1706 cm.$^{-1}$, which are characteristic of the carbonyl groups in polycarbonate and N-hydroxmethylmaleimide, respectively. The degree of imido-substitution increased as the concentration of methylene chloride was increased. A visual examination of the samples showed that the surfaces were opaque and had a high gloss. Very little pitting was noted.

Photomicrographs, comparing cross sections of the 15% sample and a nontreated sheet showed that the treated sample had an evenly distributed film on its surface which was of course, the imido-substituted polymer. The thickness of the film was found to be .26 mm.

The surface of the 20% sample was treated with UV light for 45 minutes for crosslinking the "imidized" surface. The infrared spectrum of the plastic surface after treatment showed additional structural changes.

An additional sample, which was treated with the 15% methylene chloride solution, was also treated with UV light and subjected to severe solvent and abrasion resistance tests along with untreated samples.

Both samples were subjected to a high bending stress. Acetone was applied to the surface of both in this stressed condition. The untreated sample failed immediately and the surface swelled. However, the treated sample remained unchanged, indicating the high solvent resistance of the treated surface. Microscopic observations of the surfaces of the untreated and treated samples also showed an increased abrasion resistance of the "imidized" surface.

It will be obvious that the possibility of attaching imide groups to the surface of aromatic polymers creates a host of possibilities. Due mainly to the presence of unsaturated carbon-carbon bonds, it is also possible to react chamical groups with these sites. For example, it may be desired to have a strongly halogenated surface for flame retardancy by saturating the carbon-carbon bonds by reaction with halogens. The "imidized surfaces" may be used also to chemically bond insoluble coatings.

EXAMPLE 2

0.3 gram of N-hydroxymethylmaleimide was dissolved in each of three 50 ml. boron trifluoride-etherate solutions (98% purity). After the imide had dissolved, samples of polystyrene, polycarbonate, and poly-2,6-dimethylphenylene oxide (PPO) sheets were placed in the solutions and left overnight at room temperature. The samples were then removed from the solutions, washed with water and alcohol, and then dried at 60° C. for one hour. Analyses by infrared spectroscopy indicated that the surfaces of the polystyrene, polycarbonate, and PPO sheets had reacted with the N-hydroxymethylmaleimide and therefore had been "imidized."

EXAMPLE 3

This example was run using the same condition as Example 2 except 0.15 gram of N-hydroxymethylmaleimide was used. Infrared spectroscopy indicated that the surfaces of the polystyrene, polycarbonate, and PPO sheets had been "imidized."

EXAMPLE 4

Samples of plastic sheets were placed in the following solutions which contained 0.3 gram N-hydroxymethylmaleimide:

(a) Polystyrene in 50 ml. solution containing 15% methylene chloride+85% BF$_3$·etherate by volume.

(b) Polycarbonate in 50 ml. solution containing 15% methylene chloride+85% BF$_3$·etherate by volume.

(c) Polysulfone in 50 ml. solution containing 30% methylene chloride+70% BF$_3$·etherate by volume.

(d) Poly-2,6-diphenylphenylene (P$_3$O) oxide in 50 ml. solution containing 15% methylene chloride+85% BF$_3$·etherate by volume.

(e) PPO in 50 ml. solution containing 30% methylene chloride+70% BF$_3$·etherate by volume.

The solutions were left overnight (20 hours) at room temperature. The samples were then removed from the solutions, washed with water and alcohol, and dried at 60° C. for one hour. Analyses by infrared spectroscopy indicated that the surfaces of all the samples had been "imidized."

EXAMPLE 5

Samples of polycarbonate and diphenylphenylene oxide sheets were placed in 50 ml. solutions which contained 15% chlorobenzene+85% BF$_3$·etherate by volume and 0.3 gram N-hydroxymethylmaleimide. A sample of polysulfone sheet was placed in a 50 ml. solution containing 30% chlorobenzene+70% BF$_3$·etherate by volume and 0.3 gram N-hydroxymethylmaleimide. The solutions were left overnight at room temperature. The samples were then removed from the solutions, washed with water and alcohol and dried at 60° C. for one hour. Analyses by infrared spectroscopy indicated that the surfaces of all of the samples had been "imidized."

EXAMPLE 6

Samples of polycarbonate and PPO sheets were placed in 50 ml. solutions which contained 20% benzene+80% BF$_3$·etherate by volume and 0.3 gram N-hydroxymethylmaleimide. The solutions were left overnight at room temperature. The samples were then removed from the solutions, washed with water and alcohol, and dried at 60° C. for one hour. Analyses by infrared spectroscopy indicated that the surfaces of all of the samples had been "imidized."

EXAMPLE 7

Samples of polystyrene and polycarbonate sheets were placed in 50 ml. solutions which contained 20% n-hexane+80% BF$_3$·etherate by volume and 0.3 gram N-hydroxymethylmaleimide. A sample of PPO sheet was placed in 50 ml. solution which contained 30% n-hexane+70% BF$_3$·etherate by volume and 0.3 gram N-hydroxymethylmaleimide. The solutions were agitated by stirring for 20 hours. After this time the samples were removed from the solutions, washed with water and alcohol, and dried at 60° C. for one hour. Analyses by infrared spectroscopy indicated that the surfaces of all of the samples had been "imidized."

EXAMPLE 8

Samples of polystyrene and polycarbonate sheets were placed in 50 ml. solutions which contained 20% methylene chloride+80% $BF_3$·methanol by volume and 0.3 gram N-hydroxymethylmaleimide. The solutions were left overnight. The samples were then removed from the solutions, washed with water and alcohol, and dried at 60° C. for one hour. Analyses by infrared spectroscopy indicated that the surfaces of all of the samples had been "imidized."

EXAMPLE 9

A kinetic study of the imidization of polycarbonate sheet was made by using the following procedure:

(a) Several 50 ml. solutions containing 15% methylene chloride+85% $BF_3$·etherate by volume and 0.3 N-hydroxymethylmaleimide were prepared. Samples of polycarbonate sheet were placed in each of these solutions and the imide in each solution was allowed to react with the samples at room temperature. After a given number of reaction times, the samples were removed from the reaction mixtures, washed with water and alcohol, dried at 60° C. and the surfaces were analyzed by infrared spectroscopy.

The extent of imido-substitution of each sample was determined by calculating the ratio of the absorbance of the imide carbonyl group 1706 cm.$^{-1}$ to that of the polycarbonate carbonyl group 1762 cm.$^{-1}$. Results are listed in the following table.

IMIDIZATION OF POLYCARBONATE SHEET

| | A1706[1]/A1762 | Relative percent reaction[2] |
|---|---|---|
| Reaction time, hours: | | |
| 0 | .111 | 0 |
| 1.5 | .196 | 13.0 |
| 2.5 | .231 | 18.4 |
| 3.7 | .310 | 30.4 |
| 6.0 | .339 | 34.9 |
| 7.0 | .415 | 46.6 |
| 24.0 | .636 | 82.5 |
| 48.0 | .764 | 100 |

[1] Absorbances were calculated by drawing a horizontal baseline from 1800–1700 cm.$^{-1}$.
[2] Calculated on basis of extent of reaction after 48 hours.

EXAMPLE 10

A sample of polycarbonate sheet was immersed in 50 ml. solution which contained 15% methylene chloride+85% $BF_3$·etherate by volume and 0.3 gram N-hydroxymethyltetrahydro phthalimide for 16 hours with agitation. The sample was then removed from the solution, washed with water and alcohol and dried at 60 degrees C. Analysis by infrared spectroscopy indicated that the surface of the sample had been "imidized."

EXAMPLE 11

A sample of polystyrene sheet was placed in 50 ml. solution which contained 15% methylene chloride+85% $BF_3$·etherate by volume and 0.3 gram N-hydroxymethylphthalimide. After 16 hours with agitation, the sample was removed from the solution, washed with water and alcohol, and dried at 60 degrees C. Analysis by infrared spectroscopy indicated that the surface of the sample had been "imidized."

EXAMPLE 12

Samples of polystyrene and polycarbonate sheets were placed in 50 ml. solutions which contained 15% methylene chloride+85% $BF_3$·etherate by volume and 0.3 gram N-hydroxymethyl chlorendic imide for 16 hours with agitation. The samples were then removed from the solutions, washed with water and alcohol and dried at 60 degrees C. Analysis for chlorine by vacuum X-ray fluorescence indicated that the surfaces of all the samples had been "imidized."

EXAMPLE 13

A sample of polycarbonate was immersed in 50 ml. solution which contained 15% methylene chloride+85% $BF_3$·etherate by volume and 0.3 gram N-hydroxymethylmaleimide for 24 hours with agitation. The sample was then removed from the solution, washed with water and alcohol, and dried at 60 degrees C. Analysis by infrared spectroscopy indicated that the surface of the sample had been "imidized."

The C=C bond in the imide group is very reactive toward functional groups such as —SH, —NH$_2$, —NH—, etc. The "imidized" surface of the above polycarbonate sheet was "post-treated" by reacting the imide C=C bond with neat alpha, omega, bisamino butyl siloxane fluid, which has a degree of polymerization of 30. Analysis by infrared spectroscopy indicated that the siloxane compound had reacted with the C=C bond of the imide group on the surface of the polycarbonate sheet.

The surface of the siloxane treated sample was tested in various ways. In one test, it was found that water formed a smooth film on the surface of the treated sample, whereas water formed a bead on the surface of a non-treated sample indicating that the treated surface had better characteristics than a non-treated surface. Also the surface of the siloxane treated sample showed better release characteristics toward transparent adhesive tape than the surface of a non-treated sample.

It is well known that the incorporation of siloxane compounds into materials reduces coefficient of friction. Therefore this siloxane treatment (coupled with "imidization") should allow bearings and other products in which a low coefficient of friction would be desirable to be made of plastics.

The products of the present invention are suited for a variety of uses. The solvent and abrasion resistance of the "imidized" surfaces are advantages in various plastic structures subjected to weathering conditions, abrasion, household cleaners, etc. For example, plastic housing components of room air conditioners may be treated for improved resistance to weathering and abrasion. Polycarbonate control knobs when "imidized" and treated with ultraviolet light exhibit a markedly improved resistance to attack by alkaline cleaning compounds.

It will, of course, be understood that the invention is not limited to these specific examples and it is intended by appended claims to cover all modifications thereof falling within the true spirit and scope of this invention.

What is claimed is:

1. A method for improving the surface of a shaped structure comprising an organic polymer having chemically combined aromatic carbocyclic radicals which comprises treating said surface with a solution of an imido-alkylene compound of the formula,

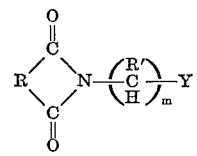

where R is a divalent organic radical selected from the class consisting of divalent hydrocarbon radicals and halogenated divalent hydrocarbon radicals, R' is selected from hydrogen monovalent hydrocarbon radicals and halogenated monovalent hydrocarbon radicals, Y is a halogen or hydroxy radical and $m$ is an integer having a value of from 1 to 4 inclusive and a Friedel-Crafts' alkylation catalyst in a solvent component having a limited solubility for the organic polymer to form on said surface a reaction product of said imido-alkylene compound and said polymer.

2. A method in accordance with claim 1 where the organic polymer is a polycarbonate.

3. A method in accordance with claim 1 where the organic polymer is a dimethylphenylene oxide polymer.

4. A method in accordance with claim 1 where the organic polymer is a polystyrene polymer.

5. A method in accordance with laim 1 where the organic polymer is a polysulfone.

6. A method in accordance with claim 1 where the organic polymer is a diphenyphenylene oxide.

7. A method in accordance with claim 1 in which said surface is thereafter subjected to ultraviolet light.

8. A method in accordance with claim 1, in which said imido-alkylene compound is N-hydroxymethylmaleimide.

9. A method in accordance with claim 1, in which said imido-alkylene compound is N-hydroxymethyltetrahydro phthalamide.

10. A method in accordance with claim 1 in which said imido-alkylene compound is N-hydroxymethylphthalimide.

11. A method in accordance with claim 1 in which said imido-alkylene compound is N-hydromethyl chlorendic imide.

12. A method according to claim 1 in which the treated surface is thereafter reacted with a siloxane compound.

13. The method of claim 12 in which said siloxane compound is alpha, omega, bis amino butyl siloxane.

References Cited

UNITED STATES PATENTS

| 2,558,675 | 6/1951 | Flory | 260—78 X |
| 2,777,830 | 1/1957 | Shivers | 260—78 |
| 3,454,550 | 7/1969 | Newland | 117—138.8 X |
| 3,510,453 | 5/1970 | Geiser | 260—78 |
| 3,652,710 | 3/1972 | Holub et al. | 260—47 |
| 3,652,715 | 3/1972 | Holub et al. | 260—47 |

OTHER REFERENCES

Gornostaeva et al., Chemical Abstracts, 1960, p. 24473g.

Tawney et al., Journal of Organic Chemistry, vol. 26, 1961, pp. 16–17.

Rabusic et al., Chemical Abstracts, vol. 68 (1968), p. 86944z.

Sisido et al., Tetrahedron Letters, 1968, pp. 5267–69.

WILLIAM D. MARTIN, Primary Examiner

S. L. CHILDS, Assistant Examiner

U.S. Cl. X.R.

117—138.8 B, 138.8 F, 138.8 UA; 204—159.11, 159.14, 159.2; 260—46.5 E, 47 CZ, 77.5 D, 77.5 R, 79.3 R, 93.5 A